(12) United States Patent  (10) Patent No.: US 7,934,293 B2
Kalargeros  (45) Date of Patent: May 3, 2011

(54) HINGE MECHANISM

(75) Inventor: Nick Kalargeros, Stratford Upon Avon (GB)

(73) Assignee: Jaguar Cars Limited, Coventry (GB)

( * ) Notice: Subject to any disclaimer, the term of this patent is extended or adjusted under 35 U.S.C. 154(b) by 132 days.

(21) Appl. No.: 11/672,276

(22) Filed: Feb. 7, 2007

(65) Prior Publication Data

US 2007/0187993 A1  Aug. 16, 2007

(30) Foreign Application Priority Data

Feb. 10, 2006 (GB) .................................. 0602586.0

(51) Int. Cl.
 *E05D 15/00* (2006.01)
(52) U.S. Cl. .......... 16/369; 16/357; 16/360; 296/187.04
(58) Field of Classification Search ............... 16/366, 16/368, 369, 357, 360, 361; 296/187.04, 296/193.11; 180/69.21
See application file for complete search history.

(56) References Cited

U.S. PATENT DOCUMENTS

| 2,173,644 | A | * | 9/1939 | Blackmore | 16/360 |
| 5,718,019 | A | * | 2/1998 | Cheal | 16/388 |
| 6,415,882 | B1 | * | 7/2002 | Schuster et al. | 180/69.21 |
| 2005/0179286 | A1 | * | 8/2005 | Adachi | 296/193.11 |
| 2005/0257980 | A1 | * | 11/2005 | Green et al. | |
| 2005/0279550 | A1 | * | 12/2005 | Saville et al. | 180/69.21 |
| 2006/0213709 | A1 | * | 9/2006 | Yamaguchi et al. | |
| 2007/0074919 | A1 | * | 4/2007 | Hirata | |

FOREIGN PATENT DOCUMENTS

| DE | 202 14 904 | | 2/2003 |
| DE | 103 14 968 | | 10/2004 |
| DE | 10 2006 017 730 | | 10/2007 |
| DE | 10 2006 017 731 | | 10/2007 |
| EP | 1-104-727 A2 | | 11/2000 |
| EP | 1-564-089 A2 | | 1/2005 |
| GB | 2-381-509 A | | 11/2001 |
| GB | 2386875 | | 1/2003 |
| GB | 2-400-826 A | | 4/2003 |
| GB | 2-410-924 A | | 2/2004 |
| GB | 2435016 | * | 8/2007 |
| JP | 04011181 A | * | 1/1992 |
| WO | 2005118358 | | 12/2005 |
| WO | 2007/028229 | | 3/2007 |

OTHER PUBLICATIONS

European Search Report for EP 06270094, dated Apr. 23, 2007.
UK Search Report for GB0715116.0 dated Sep. 19, 2007.
UK Search Report for GB0803275.7 dated May 21, 2008.
UK Search Report for GB0716364.5 dated Nov. 20, 2007.

* cited by examiner

*Primary Examiner* — Victor Batson
*Assistant Examiner* — Jeffrey O'Brien
(74) *Attorney, Agent, or Firm* — Brooks Kushman P.C.

(57) ABSTRACT

A hinge mechanism 10 to lift the rear edge of a bonnet 11 of a motor vehicle comprises an upper leaf 13 connected to the bonnet 11, a lower leaf 12 connected to the body structure of the vehicle and a middle leaf 14 connected to the upper leaf 13 and the lower leaf 12. The middle leaf 14 is connected to the upper leaf 13 by means of a stud 16 and a slot 17 connection so as to limit movement of the bonnet from a normal position to a deployed position under an upward force exerted by a lift actuator. The stud 16 and slot 17 connection is provided with a resiliently deformable element 30 arranged at the end of the slot for dissipating impact energy of the stud 16 against the slot 17 during the upward force.

8 Claims, 3 Drawing Sheets

HINGE MECHANISM

Figure 1:
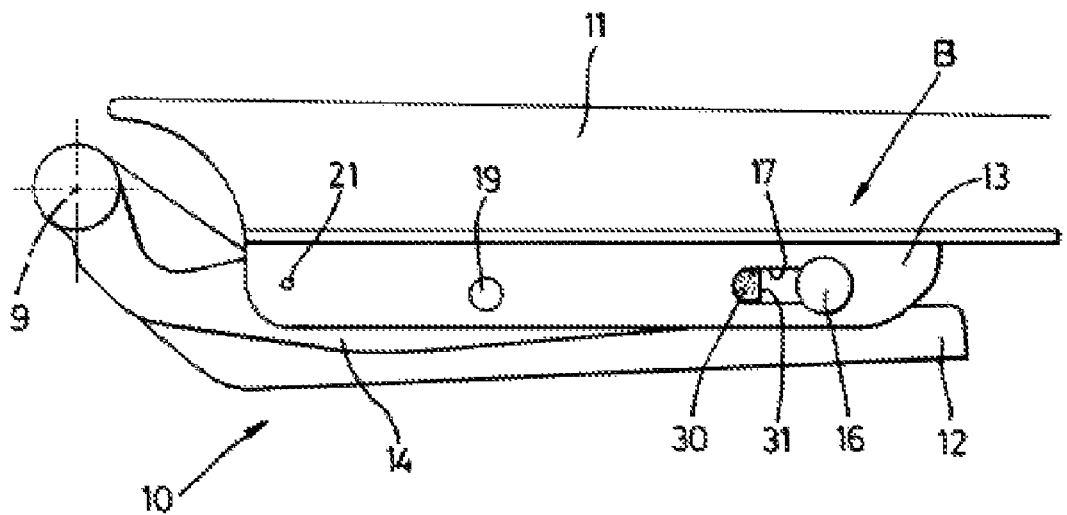

The present invention relates to a hinge mechanism to lift the rear edge of a hood or a bonnet of a motor vehicle providing improved pedestrian safety.

Various hinge mechanisms have been proposed to mount the bonnet to a body structure such that, in the event of a detected collision with a pedestrian, the rear edge of the bonnet is raised by means of at least one lift actuator from its normal closed position to a partially raised position. Such hinge mechanisms usually have a first operating mode in which the front edge of the bonnet can be lifted in a normal way about a pivot axis defined at the rear of the bonnet by the hinge and a second operating mode in which the rear edge of the bonnet can be raised by the lift actuator. One known type of hinge mechanism allows for upward movement of the bonnet by means of a co-operating stud and slot arranged on the hinge. See, for example, GB 2 410 924 which shows a hinge mechanism for pivotally mounting a bonnet on a body structure and lift actuators. Each hinge mechanism has a slot which releasably connects with a stud attached to the body structure so that the stud can move freely along the slot under the application of the upward force applied by the lift actuators until it strikes the end of the slot.

It is a problem with such a known hinge mechanism that when the bonnet is lifted by the lift actuators, the magnitude of the impact of the stud with the end of the slot causes the bonnet to oscillate or flutter. This oscillation of the bonnet can have negative effect on the impact performance of the bonnet, especially if the bonnet is flexing upwards when a pedestrian strikes the bonnet. Then the relative velocity is greater than if the bonnet is stationary (relative to the vehicle) or is moving downward. To overcome this problem, it is proposed in GB 2 410 924 to produce a resistance to motion of the stud as it approaches the end of the slot, for instance by varying the width of the slot. Although such a design can overcome the problem, it may have an incidental effect on the deployment time needed to raise the bonnet.

It is an object of this invention to provide an improved hinge mechanism for a vehicle bonnet motor which solves or alleviates the problem associated with the prior art.

According to a first aspect of the invention there is provided a hinge mechanism for providing a hinged connection between a bonnet and a body structure of a motor vehicle, the hinge mechanism allowing the rear edge of the bonnet to be lifted from a normal position to a deployed position under an upward force, the hinge mechanism including first and second hinge members which in normal position are fast with each other but which move relative to each other when the bonnet is moved from the normal position to the deployed position, the first hinge member having a slot and the second hinge member having a stud which is slidable in the slot during movement of the bonnet from the normal position into the deployed position and wherein energy dissipating means is provided to dissipate impact energy of the stud against the end of the slot as the bonnet approaches the deployed position.

The energy dissipating means may be a resiliently deformable element connected to the first hinge member at one end of the slot.

In an alternative, the energy dissipating means includes at least one bridge piece formed between an aperture and one end of the slot such that the or each bridge piece can deform under impact energy of the stud against the end of the slot as the bonnet approaches the deployed position.

According to a second aspect of the invention there is provided a motor vehicle having at least one hinge mechanism according to the first aspect of the invention.

The invention will now be described by way of example with reference to the accompanying drawings of which:—

Figure 2:
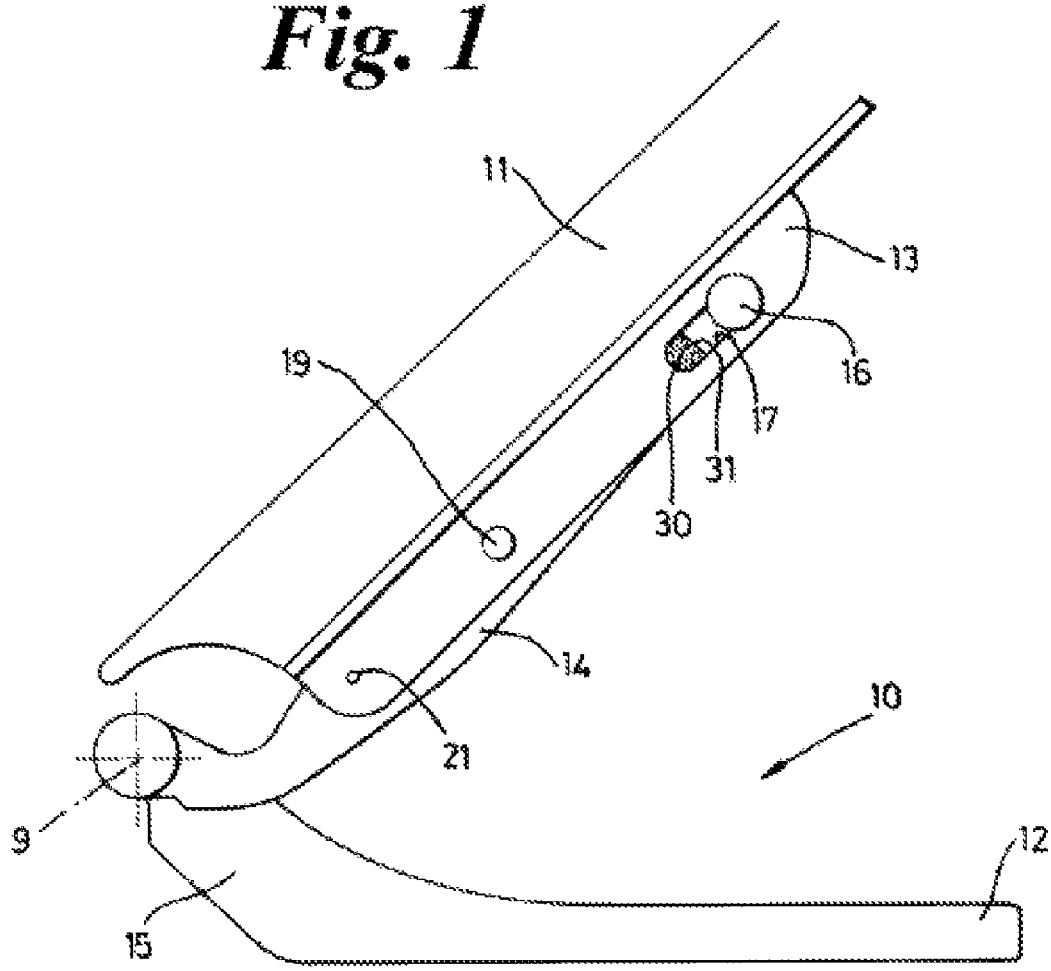
Figure 3:
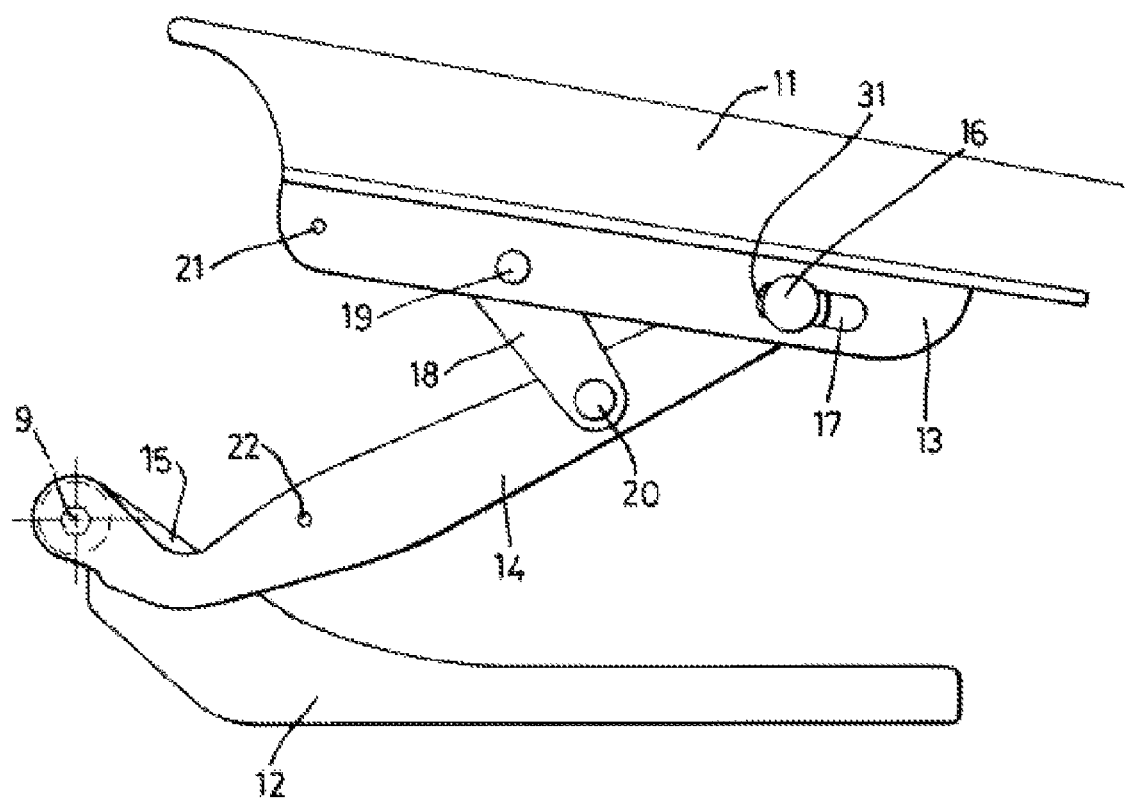
Figure 4:
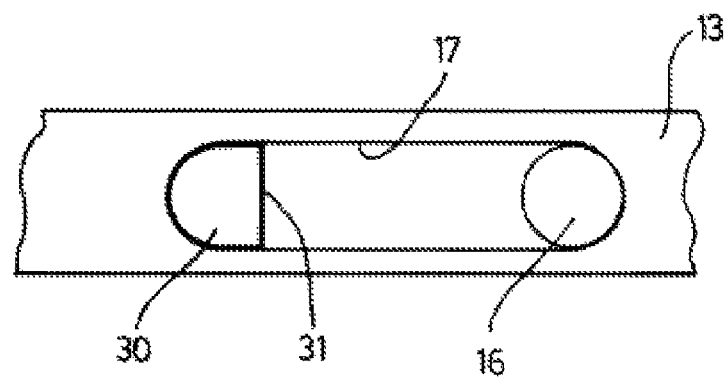
Figure 5:
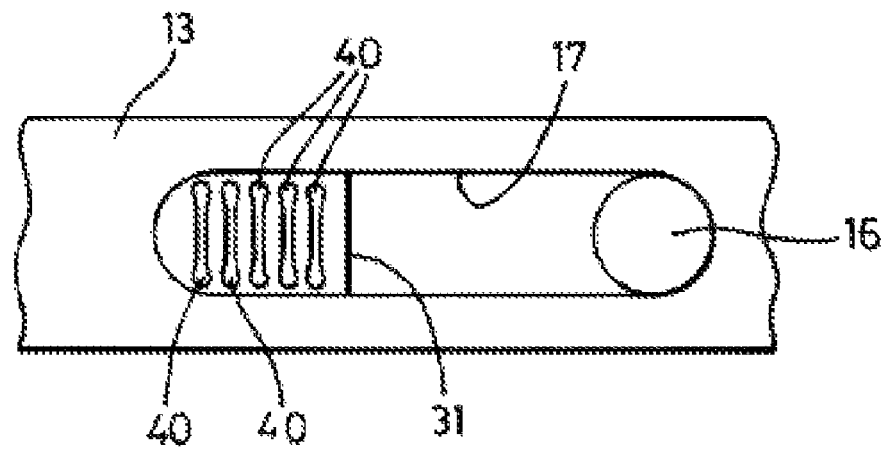
Figure 6:
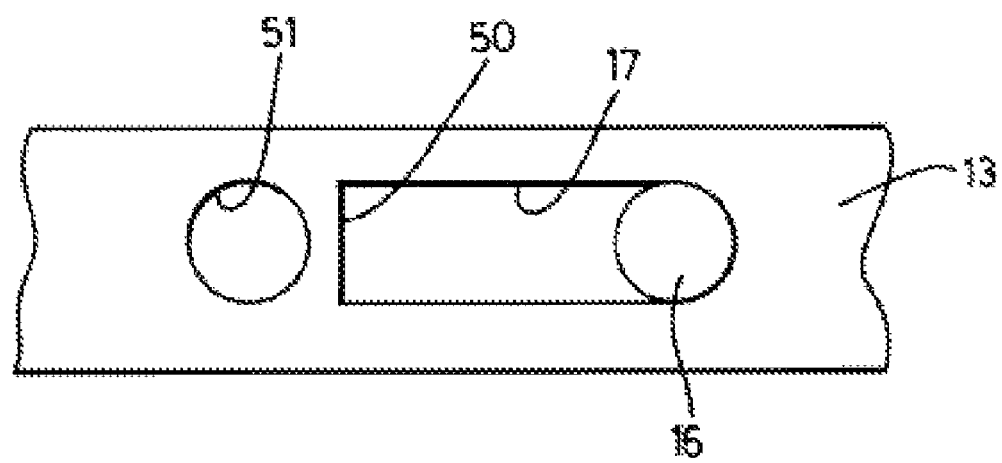

FIG. 1 is a schematic of a hinge mechanism connected to the rear edge of a bonnet in its normal position, FIG. 2 is a view similar to FIG. 1 but showing the hinge mechanism in its open position, i.e. when the bonnet is opened in the normal way, FIG. 3 is a view similar to FIG. 1 but showing the hinge mechanism in an extended position in the event of a detected collision with a pedestrian, FIG. 4 is a scrap view in to the direction of arrow B in FIG. 1 to a larger scale, and FIGS. 5 and 6 are views similar to FIG. 4 but showing two alternatives respectively.

With reference to FIGS. 1 to 3, there is shown a hinge mechanism 10 intended to pivotally connect a rear edge of a bonnet 11 to a vehicle body structure (not shown). It will be noted that the bonnet 11 is pivotally attached in a conventional manner by two hinge mechanism (only one shown) each located towards respective right and left hand sides of the bonnet.

Each hinge mechanism 10 is associated with a lift actuator (not shown). Each hinge mechanism 10 comprises, in this example, three steel leaves (also called hinge members), a lower leaf 12 attached to part of the body structure, an upper leaf 13 attached to the bonnet 11 and a middle leaf 14 connected to the lower and upper leaves 12, 13.

The lower leaf 12 has, at its rearward end, an upwardly extending portion 15 which is pivotally attached to the rearward end of middle leaf 14. At its free end the middle leaf 14 has a laterally extending stud 16.

The upper leaf 13 has at its forward end an elongate slot 17. As can best be seen in FIGS. 2 and 3, the stud 16 extends through the slot 17 and is slideable along the slot 17.

A guide link 18 is pivotally connected in a known manner at one of its ends 20 to the middle leaf 14 and at its other end 19 to the upper leaf 13.

The end of the upper leaf 13 remote from the slot 17 is releasably attached to the middle leaf 14 by a releasable locking member. In this example, the locking member is a moveable pin (not shown) connected to the bonnet which engages apertures 21, 22 formed in the upper and middles leaves 13, 14. However, other locking members are possible such as a releasable locking member which is formed by the co-operation of a tab in the upper leaf, with a corresponding recess in the middle leaf.

Referring now in particular to FIG. 4, the upper leaf 13 is provided with an energy dissipating means at the rearward end of the slot 17. The energy dissipating means, shown in FIG. 4, is a resiliently deformable element 30 made of elastomeric material. The deformable element 30 is, in this example, moulded on to the upper leaf 13 such that part of the rearward end of the slot 17 is closed, thus forming a buffer wall 31.

During normal operation of the hinge mechanism 10, the bonnet 11 is articulated around a pivot axis 9 between the lower leaf 12 and the middle leaf 14 as the upper leaf 13 is prevented from pivoting with respect to the middle leaf 14 about the co-operation stud-slot by the releasable locking member.

When a pedestrian collision is detected, the locking member is removed from the apertures 21,22 and the lift actuator begins to deploy. The upward force exerted by the lift actuators lifts the rear end of the bonnet into a deployed position and opens the hinge mechanism 10 into an extended position (FIG. 3) in which the stud 16 of the middle leaf 14 slides along the slot 17 of the upper leaf 13 until the stud 16 strikes the buffer wall 31 of the deformable element 30 as the bonnet approaches the deployed position. The hysteresis of the deformable element 30 absorbs a large proportion of the kinetic energy of the rising bonnet 10 thus limiting any tendency for the bonnet 10 to oscillate after the lift actuator has been fully deployed.

In a modification shown in FIG. 5, the resiliently deformable element 30 has numerous elongated cavities 40, each cavity having a bone shaped form with a longitudinal axis which is substantially perpendicular to the direction of travel of the stud 16 along the slot 17. It has been found that with such a shape the deformable element 30 is able to dissipate a large amount of energy. The element 30 may have any number of cavities 40 and any type of shape according to the amount of energy that it is necessary to dissipate.

An alternative embodiment of the energy dissipating means is shown in FIG. 6, the rearward end of the slot 17 is formed by a end wall 50 behind which is formed an aperture 51 so that a bridge piece formed between the aperture 51 and the end wall 50 can deform under the striking force of the stud 16 against this wall 51, and thereby dissipating the over-travel of stud 16. In a modification several apertures can be successively formed on the upper leaf behind the slot 17, thus forming several bridge pieces which can deform progressively.

Although the invention has been described by way of example with reference to a specific hinge mechanism, the energy dissipating means can be applied to other hinge mechanisms in which a stud and slot connection is used to limit the deploying movement of the bonnet from the normal, closed position to a deployed position in the event of a pedestrian collision, for instance as described in GB 2 410 924 which discloses only two leaves where the slot is formed on the lower leaf connected to the body structure. Besides, various modifications may be made without departing from the invention. For instance, the buffer wall 31 can have a surface that curves outward instead of being perpendicular.

The invention claimed is:

1. A hinge mechanism for providing a hinged connection between a bonnet and a body structure of a motor vehicle, the hinge mechanism allowing a rear edge of the bonnet to be lifted from a normal position to a deployed position under an upward force, the hinge mechanism comprising:
    first and second hinge members which in the normal position are fast with each other but which move relative to each other when the bonnet is moved from the normal position to the deployed position, the first hinge member having a slot of substantially constant width with a first end and a second end, and the second hinge member having a stud which is slidable in the slot from the first end to the second end during movement of the bonnet from the normal position into the deployed position; and
    an energy dissipating means is provided at the second end of the slot to dissipate impact energy of the stud against the second end of the slot as the bonnet approaches the deployed position, wherein the energy dissipating means includes a resiliently deformable element connected to the first hinge member at the second end of the slot and the deformable element has at least one elongate cavity having a longitudinal axis which is substantially perpendicular to a travel direction of the stud.

2. A hinge as claimed in claim 1 in which each cavity is bone shaped.

3. A hinge as claimed in claim 1 in which the deformable element has a buffer wall arranged to abut the stud.

4. A hinge as claimed in claim 1 in which the deformable element is made of elastomeric material.

5. A motor vehicle having the hinge mechanism of claim 1.

6. A hinge mechanism for providing a hinged connection between a bonnet and a body structure of a motor vehicle, the hinge mechanism allowing a rear edge of the bonnet to be lifted from a normal position to a deployed position under an upward force, the hinge mechanism comprising:
    first and second hinge members which in the normal position are fast with each other but which move relative to each other when the bonnet is moved from the normal position to the deployed position, the first hinge member having a slot of substantially constant width with a first end and a second end, and the second hinge member having a stud which is slidable in the slot from the first end to the second end during movement of the bonnet from the normal position into the deployed position, wherein a resiliently deformable element having at least one cavity is provided at the second end of the slot to dissipate impact energy of the stud against the second end of the slot as the bonnet approaches the deployed position.

7. The hinge mechanism as claimed in claim 6 wherein the at least one cavity includes a plurality of cavities each having a longitudinal axis substantially perpendicular to a travel direction of the stud.

8. A motor vehicle having the hinge mechanism of claim 6.

* * * * *